(12) United States Patent
Van der Merwe

(10) Patent No.: US 11,868,972 B2
(45) Date of Patent: Jan. 9, 2024

(54) METHOD AND SYSTEM OF VALIDATING CASH TRANSACTIONS

(71) Applicant: Safe Take Cash (Pty) Ltd., The Wilds (ZA)

(72) Inventor: Alwyn Van der Merwe, The Wilds (ZA)

( * ) Notice: Subject to any disclaimer, the term of this patent is extended or adjusted under 35 U.S.C. 154(b) by 339 days.

(21) Appl. No.: 17/294,714

(22) PCT Filed: Nov. 21, 2019

(86) PCT No.: PCT/IB2019/060024
§ 371 (c)(1),
(2) Date: May 18, 2021

(87) PCT Pub. No.: WO2020/104985
PCT Pub. Date: May 28, 2020

(65) Prior Publication Data
US 2022/0012696 A1 Jan. 13, 2022

(30) Foreign Application Priority Data
Nov. 22, 2018 (ZA) .................................. 2018/07881

(51) Int. Cl.
*G06Q 20/02* (2012.01)
*G07D 11/30* (2019.01)
(Continued)

(52) U.S. Cl.
CPC ......... *G06Q 20/02* (2013.01); *G06Q 20/1085* (2013.01); *G06Q 20/202* (2013.01);
(Continued)

(58) Field of Classification Search
CPC .. G06Q 20/02; G06Q 20/1085; G06Q 20/202; G06Q 20/204; G06Q 20/4012;
(Continued)

(56) References Cited

U.S. PATENT DOCUMENTS 9,355,295 B1 5/2016 Jones
2012/0185395 A1* 7/2012 Wilkes ................... G06Q 20/14
705/44

(Continued)

OTHER PUBLICATIONS

United States Patent and Trademark Office, International Search Report for PCT/IB2019/060024, dated Feb. 3, 2020.
(Continued)

*Primary Examiner* — Patrick McAtee
*Assistant Examiner* — Vincent I Idiake
(74) *Attorney, Agent, or Firm* — Laurie A. Schlichter, PLLC

(57) ABSTRACT

Disclosed herein is a method of validating cash transactions at a cash validation server of a cash transaction validation system. The method comprises capturing a unique identifier of a banknote of a user; storing the unique identifier of the banknote against a user identity of the user in a database connected to the cash validation server; checking the unique identifier of the banknote against the user identity stored in the database when the banknote is received as tender for payment at a receiving Cash Processing Terminal (CPT); requesting an authorization from the user to release the banknote for payment; transmitting an accept banknote message to the receiving CPT when a successful authorization is received and transmitting a decline banknote message to the receiving CPT when a failed authorization is received.

20 Claims, 4 Drawing Sheets

(51) Int. Cl.
| | |
|---|---|
| *G06Q 20/10* | (2012.01) |
| *G06Q 20/00* | (2012.01) |
| *G06Q 20/40* | (2012.01) |
| *G06Q 40/02* | (2023.01) |
| *G07D 7/2033* | (2016.01) |
| *G07F 19/00* | (2006.01) |
| *G06Q 20/20* | (2012.01) |

(52) U.S. Cl.
CPC ....... *G06Q 20/204* (2013.01); *G06Q 20/4012* (2013.01); *G06Q 20/4014* (2013.01); *G06Q 40/02* (2013.01); *G07D 7/2033* (2013.01); *G07D 11/30* (2019.01); *G07F 19/211* (2013.01); *G07D 2207/00* (2013.01)

(58) Field of Classification Search
CPC .. G06Q 20/4014; G06Q 40/02; G06Q 20/085; G06Q 20/0855; G06Q 20/206; G07D 7/2033; G07D 11/30; G07D 2207/00; G07D 11/20; G07D 11/32; G07F 19/211; G07F 19/202; G07F 19/203; G07F 19/206

See application file for complete search history.

(56) References Cited

U.S. PATENT DOCUMENTS

| | | | |
|---|---|---|---|
| 2013/0026227 A1* | 1/2013 | Laskowski | G07D 11/24 235/379 |
| 2015/0242825 A1* | 8/2015 | Mills | G06Q 20/401 705/64 |
| 2015/0287133 A1 | 10/2015 | Marlov | |
| 2016/0247018 A1 | 8/2016 | Srivastava | |

OTHER PUBLICATIONS

United States Patent and Trademark Office, Written Opinion of the International Searching Authority for PCT/IB2019/060024, dated Feb. 3, 2020.

* cited by examiner

METHOD AND SYSTEM OF VALIDATING CASH TRANSACTIONS

TECHNICAL FIELD

The present disclosure relates generally to techniques for validating cash transactions. More specifically, the present techniques relate to verifying or validating the legitimacy of banknotes.

BACKGROUND ART

Tracking the movement of banknotes is similar to tracking the movement of parcels by a courier service. Typically, users are able to track banknotes via user-registered websites. However, in some countries like the United States, the marking of banknotes is illegal if there is intent to render the notes unfit to be re-issued.

Intelligent banknote neutralization systems render cash unusable by marking the cash with a degradation agent when an attempted attack on the systems is detected. For example, as a popular agent, ink is used to permanently stain banknotes to flag the banknotes as stolen. Such neutralization systems have the aim, among others, of providing additional security for cash-in-transit and consumer payments.

BRIEF DESCRIPTION OF THE DRAWINGS

The same numbers are used throughout the disclosure and the figures to reference like features. Numbers in the 100 series refer to features originally found in FIG. 1; numbers in the 200 series refer to features originally found in FIG. 2; and so on.

DESCRIPTION OF THE EMBODIMENTS

Figure 1:
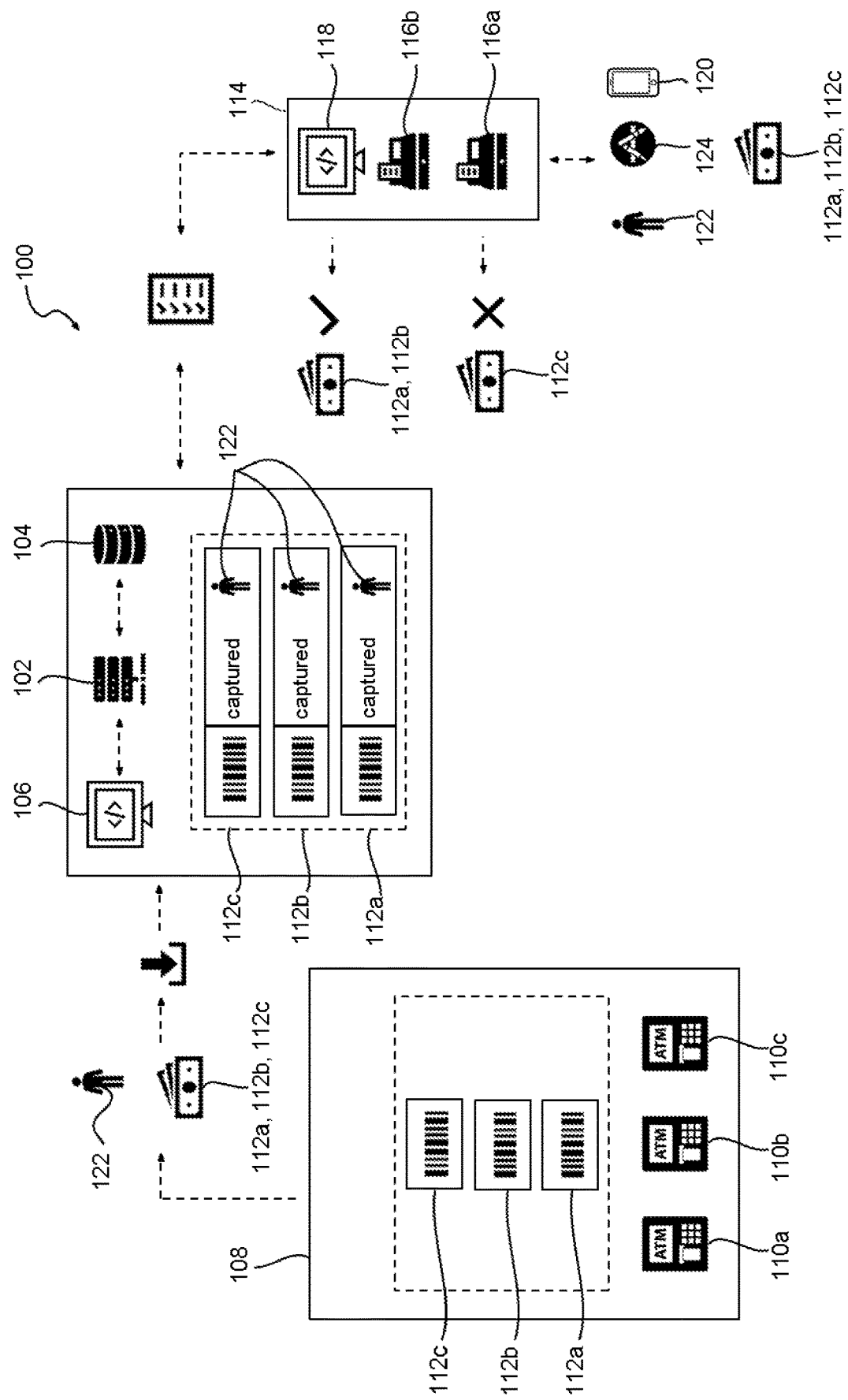
FIG. 1 is a schematic diagram of a cash transaction validation system according to a first embodiment of the present techniques.

According to a first embodiment, a method of validating cash transactions may be conducted at a cash validation server of a cash transaction validation system. The method may include:
  capturing a unique identifier of one or more banknotes of a user;
  storing the unique identifier of the one or more banknotes against a user identity of the user in a database connected to the cash validation server;
  upon receiving the one or more banknotes as tender for payment at a receiving Cash Processing Terminal (CPT), checking the unique identifier of the one or more banknotes against the user identity stored in the database; requesting an authorization from the user to release the one or more banknotes for payment; in response to receiving a successful authorization, transmitting an accept banknote message to the receiving CPT and in response to receiving a failed authorization, transmitting a decline banknote message to the receiving CPT.

Requesting the authorization from the user may include authenticating the user using a Personal Identification Number (PIN) or a two-factor authentication method.

The receiving CPT may include a merchant Point-of-Sale (POS) terminal of a cashier, for example a mobile merchant POS terminal.

Checking the unique identifier of the one or more banknotes against the user identity stored in the database may include electronically receiving the unique identifier at a client-side cash validation application installed on the merchant POS terminal and transmitting the unique identifier to a server-side cash validation application installed on the cash validation server.

The client-side cash validation application may be integrated with the merchant POS terminal.

Capturing the unique identifier of the one or more banknotes may include capturing the unique identifier upon withdrawal of the one or more banknotes at a dispensing CPT. To this end, the method may include accessing a dispensing storage controller of the dispensing CPT.

Requesting an authorization from the user may include receiving the authorization from a front-end user terminal having installed thereon a user authentication application in data communication with the merchant POS terminal or the server-side cash validation application installed on the cash validation server.

The front-end user terminal may include a mobile device or a desktop computer. When the front-end user terminal is a mobile device, the user authentication application may include a mobile device application, for example an iOS® or Mac® App Store application. When the front-end user terminal is a desktop computer, the user authentication application may include a desktop computer application or a browser-based application.

The method may include flagging the unique identifier of the one or more banknotes with a captured or released status. To this end, the captured or released status may be updated by the user, the merchant or the server-side cash validation application.

The unique identifier of the one or more banknotes may include a banknote serial number, a barcode or any other suitable identifier.

The dispensing CPT may form part of a local dispensing CPT network, and the merchant POS terminal may form part of a local merchant POS network.

The local dispensing CPT network may include a cluster of CPTs of the bank. Likewise, the local merchant POS network may include a cluster of POS terminals of the merchant.

The cash validation server may be located in a network remote from the local dispensing CPT network and the local merchant POS network. For example, the cash validation server and the database connected thereto may be cloud-based.

Capturing the unique identifier of the one or more banknotes upon withdrawal may include presenting the user with an option to capture the unique identifier of the one or more banknotes at the dispensing CPT.

The dispensing CPT may include an Automatic Teller Machine (ATM) or any other suitable device for dispensing cash.

The method of validating cash transactions may include tracking the one or more banknotes via the unique identifier. Tracking the one or more banknotes may include analyzing the lifecycle of the one or more banknotes and providing supply and location intelligence of the one or more banknotes.

The method may include, upon receipt of the authorization from the user, displaying a notification of the user identity and the status of the one or more banknotes at the merchant POS terminal.

The client-side cash validation application, server-side cash validation application, and user authentication application may be in communication with each other via a peer-to-peer network.

It should be appreciated that the method provides for the enabling and disabling of banknotes to control their tenderability. The enabling and disabling of the banknotes may provide for the temporary suspension of the intrinsic value of the banknotes, thereby eliminating the anonymity associated with cash.

A cash transaction validation system may conduct the method of validating cash transactions as hereinbefore described. The system may include:
- a cash validation server connected to a database, the cash validation server having installed thereon a server-side cash validation application and
- a receiving Cash Processing Terminal (CPT) having installed thereon a client-side cash validation application. The system may operate to:
- capture a unique identifier of one or more banknotes of a user; store the unique identifier of the one or more banknotes against a user identity of the user in the database;
- upon receiving the one or more banknotes as tender for payment at the receiving CPT, check the unique identifier of the one or more banknotes against the user identity stored in the database; request an authorization from the user to release the one or more banknotes for payment; in response to receiving a successful authorization, transmit an accept banknote message to the receiving CPT and in response to receiving a failed authorization, transmit a decline banknote message to the receiving CPT.

Various examples of the present techniques are described below with reference to the accompanying figures.

FIG. 1 is a schematic diagram of a cash transaction validation system according to a first embodiment of the present techniques. The system 100 may include a cash validation server 102 connected to a repository in the form of a database 104. A server-side cash validation application 106 may be installed on the cash validation server 102.

To one side, the cash validation server 102 may be in data communication with a local dispensing Cash Processing Terminal (CPT) network 108 having dispensing CPTs in the form of ATMs 110a, 110b and 110c. The local dispensing CPT network 108 may hold three banknotes at its ATMs 110a, 110b and 110c, the banknotes having unique identifiers 112a, 112b and 112c.

To another side, the cash validation server 102 may be in data communication with a local receiving CPT network 114 which includes receiving CPTs in the form of merchant Point-of-Sale (POS) terminals 116a and 116b. A client-side cash validation application 118 may be installed on the merchant POS terminals 116a and 116b, the client-side cash validation application 118 being integrated with the merchant POS terminals 116a and 116b.

The cash transaction validation system 100 may include a front-end user terminal in the form of a mobile device 120 of a user 122. The mobile device 120 may have installed thereon a user authentication application 124 in data communication with the merchant POS terminals 116a and 116b and the cash validation server 102.

Figure 2:
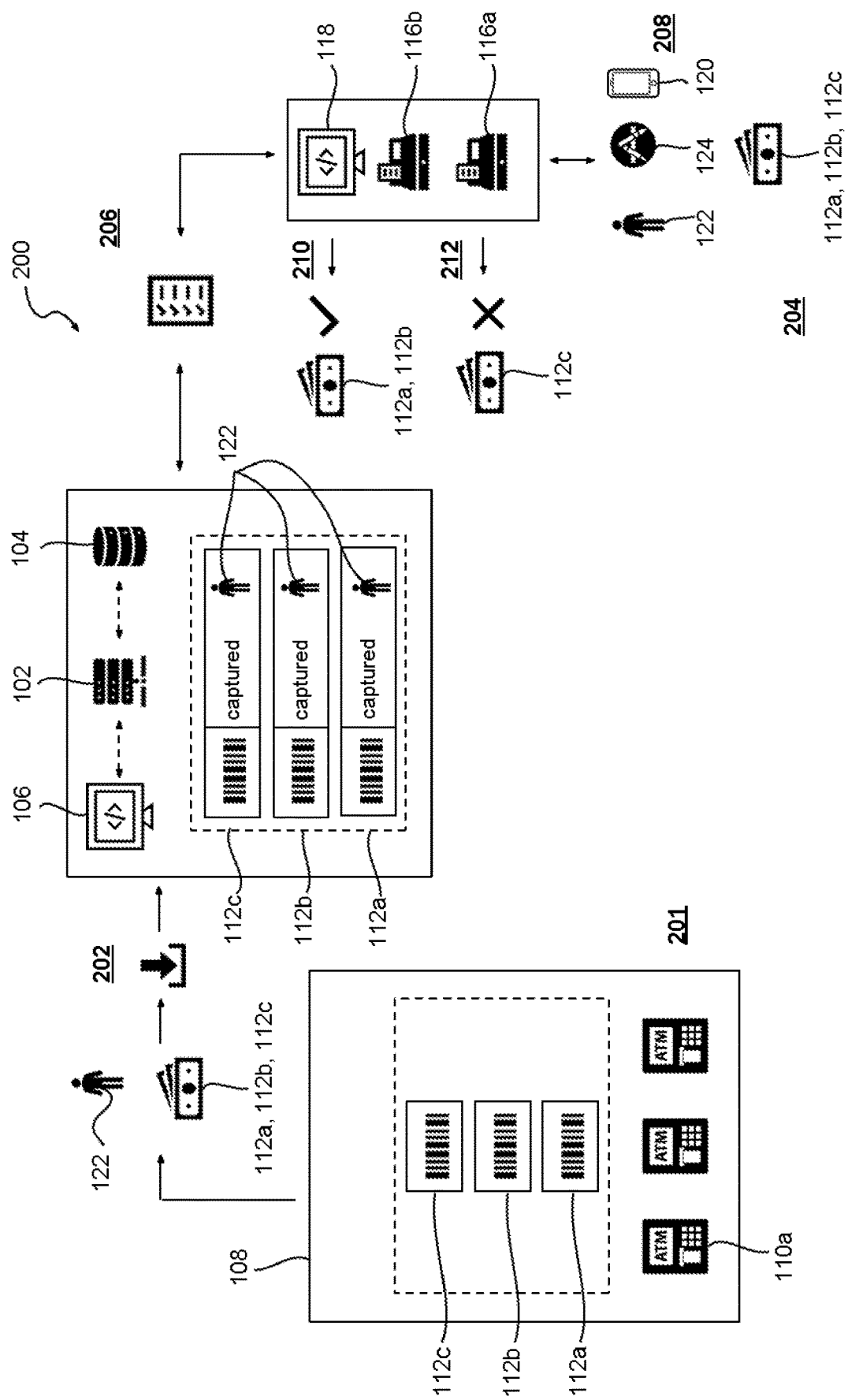
FIG. 2 is a schematic diagram of a cash transaction validation method implemented by the system shown in FIG. 1.

As will become more apparent with reference to FIG. 2, the cash transaction validation system 100 may operate to capture the unique identifiers 112a, 112b and 112c of the banknotes of the user 122 upon withdrawal of the banknotes by the user 122; store the unique identifiers 112a, 112b and 112c against a user identity of the user 122 in the database 104; upon tendering of the banknotes for payment at the merchant POS terminals 116a and 116b, check or look up the unique identifiers 112a, 112b and 112c of the banknotes against the user identity stored in the database 104; request an authorization from the user 122 to release the banknotes for payment; in response to receiving a successful authorization from the user 122, transmit an accept banknote message to the receiving CPTs, i.e., the merchant POS terminals 116a and 116b, and in response to a failed authorization, transmit a decline banknote message to the receiving CPTs, i.e., the merchant POS terminals 116a and 116b.

FIG. 2 is a schematic diagram of a cash transaction validation method implemented by the system shown in FIG. 1.

At 201 of the method 200, the user 122 may withdraw the three banknotes from the ATM 110a that forms part of the local dispensing CPT network 108. Upon withdrawal of the banknotes, the user 122 may be presented with an option to have the unique identifiers 112a, 112b and 112c of the banknotes captured by the system 100.

At 202 and upon the user 122 electing to capture the unique identifiers 112a, 112b and 112c of the banknotes, the unique identifiers 112a, 112b and 112c may be captured and stored against the user identity of the user 122 in the database 104 connected to the cash validation server 102. In this embodiment, the unique identifiers 112a, 112b and 112c are banknote serial numbers.

At 204, the banknotes having the unique identifiers 112a and 112b may be tendered as payment for goods at the merchant POS terminal 116b and the banknote having the unique identifier 112c may be tendered as payment for goods at the merchant POS terminal 116a.

At 206, the unique identifiers 112a, 112b and 112c may be checked against the user identity stored in the database 104 by electronically receiving the unique identifiers 112a, 112b and 112c at the client-side cash validation application 118 installed on the merchant POS terminals 116a and 116b and the unique identifiers 112a, 112b and 112c may be transmitted to the server-side cash validation application 106 installed on the cash validation server 102.

At 208, the user 122 may be requested to authorize the release of the banknotes having the unique identifiers 112a, 112b and 112c. In an example, requesting the authorization from the user 122 includes authenticating the user 122 at the merchant POS terminals 116a and 116b using a Personal Identification Number (PIN). In another example, requesting the authorization from the user 122 includes authenticating the user 122 at the merchant POS terminals 116a and 116b using two-factor authentication. In yet another example, requesting the authorization from the user 122 includes receiving the authorization from the front-end user terminal in the form of the mobile device 120 having installed thereon the user authentication application 124 which is in data communication with the server-side cash validation application 106 installed on the cash validation server 102.

At 210, upon receipt of a successful authorization for release, the banknotes having unique identifiers 112a and 112b may be flagged with a released status and an accept banknote message may be transmitted to the merchant POS terminal 116*b* for acceptance of the banknotes as payment.

At 212, in response to a failed authorization for release, the captured status of the banknote having unique identifier 112*c* may remain unchanged, a decline banknote message may be transmitted to the merchant POS terminal 116*a* and the banknote may be rejected as payment.

Figure 3:
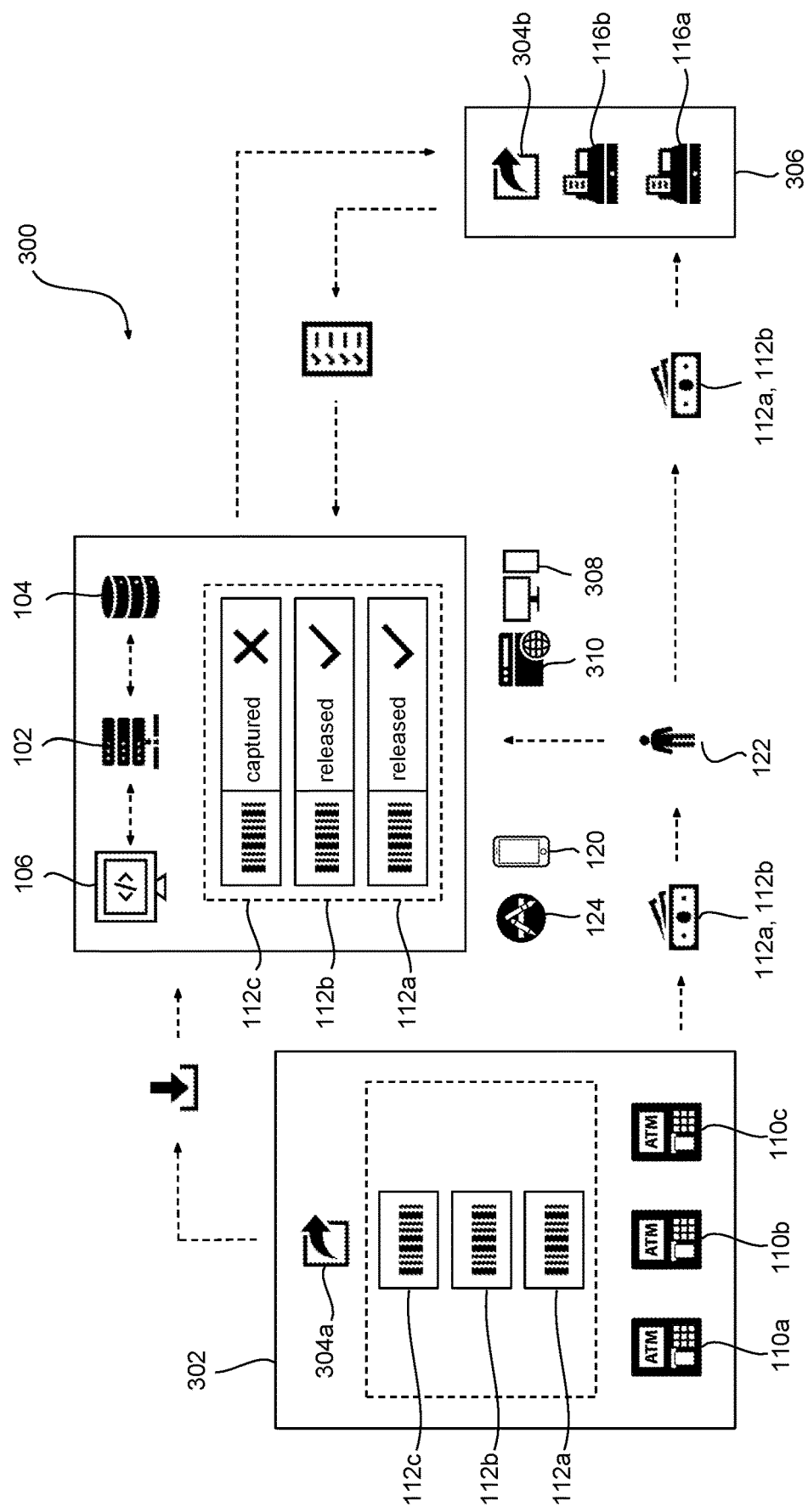
FIG. 3 is a schematic diagram of a cash transaction validation system according to a second embodiment of the present techniques.

FIG. 3 is a schematic diagram of a cash transaction validation system according to a second embodiment of the present techniques. The system 300 may include a cash validation server 102 connected to a repository in the form of a database 104 and a server-side cash validation application 106.

To one side, the cash validation server 102 may be in data communication with a local dispensing Cash Processing Terminal (CPT) network 302 having dispensing CPTs in the form of ATMs 110*a*, 110*b* and 110*c*, and a dispensing storage controller 304*a*. The local dispensing CPT network 302 may hold three banknotes of a user 122 at its ATMs 110*a*, 110*b* and 110*c*, the banknotes having unique identifiers 112*a*, 112*b* and 112*c* in the form of banknote serial numbers.

To another side, the cash validation server 102 may be in data communication with a local receiving CPT network 306 which may include receiving CPTs in the form of merchant Point-of-Sale (POS) terminals 116*a* and 116*b*, and a receiving storage controller 304*b*.

In this embodiment, the cash transaction validation system 300 may include a front-end user terminal in the form of a mobile device 120 having installed thereon a client-side cash validation application in the form of a mobile device application 124. The mobile device application 124 may have been downloaded from an online store by the user 122. The cash transaction validation system 300 may further include a front-end user terminal in the form of a desktop computer 308 having installed thereon a client-side cash validation application in the form of a browser-based application 310.

The system 300 may operate to capture the unique identifiers 112*a*, 112*b* and 112*c* of the banknotes; store the unique identifiers 112*a*, 112*b* and 112*c* against the user identity in the database 104 connected to the cash validation server 102; add a captured or released status to the unique identifiers 112*a*, 112*b* and 112*c*; upon tendering a banknote for payment at the merchant POS terminal 116*a* or 116*b*, take the unique identifier 112*a*, 112*b* or 112*c* of the tendered banknote, and check its captured or released status; in response to a captured status, transmit a decline banknote message to the merchant POS terminal 116*a* or 116*b* and in response to a released status, transmit an accept banknote message to the merchant POS terminal 116*a* or 116*b*.

Figure 4:
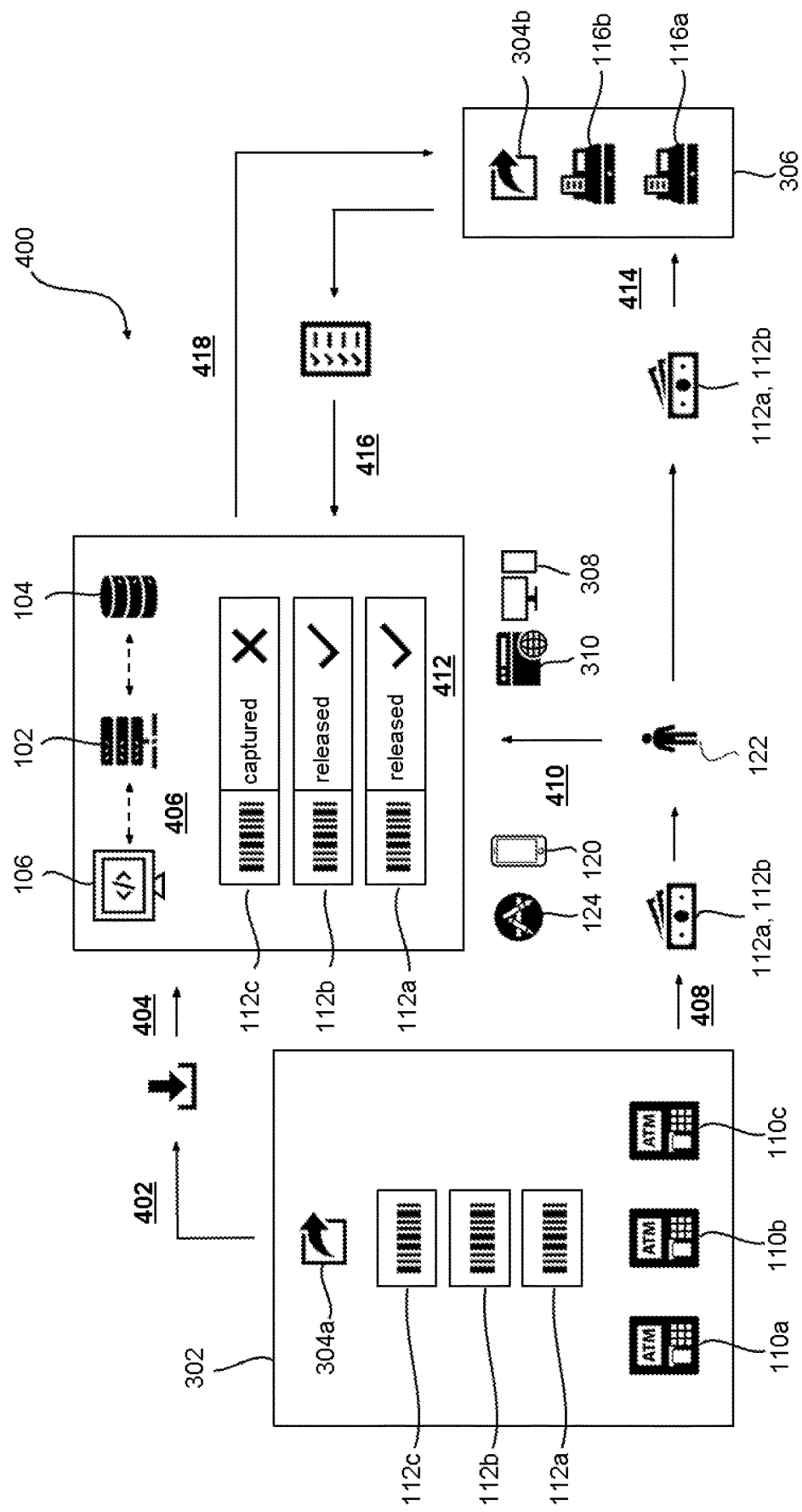
FIG. 4 is a schematic diagram of a cash transaction validation method implemented by the system shown in FIG. 3.

FIG. 4 is a schematic diagram of a cash transaction validation method implemented by the system shown in FIG. 3.

At 402 of the method 400, the cash validation server 102 may access the ATMs 110*a*, 110*b* and 110*c* of the local dispensing CPT network 302 via the dispensing storage controller 304*a* and may capture the unique identifiers 112*a*, 112*b* and 112*c* in the form of banknote serial numbers. In this embodiment, the unique identifiers 112*a*, 112*b* and 112*c* are captured upon withdrawal of the banknotes and the ATMs 110*a*, 110*b* and 110*c* are accessed electronically via the dispensing storage controller 304*a* by the server-side cash validation application 106.

At 404, the unique identifiers 112*a*, 112*b* and 112*c* of the banknotes may be stored against the user identity of the user 122 in the database 104 connected to the cash validation server 102.

At 406, the server-side cash validation application 106 may add or append to each unique identifier 112*a*, 112*b* and 112*c* a captured status which means the banknotes have not yet been released by the user 122.

At 408, the user 122 may withdraw the banknotes having the unique identifiers 112*a* and 112*b* with the aim of tendering the banknotes for payment at a receiving CPT in the form of the merchant POS terminal 116*a*.

At 410, the user 122 may communicate with the cash validation server 102 via the front-end user terminal in the form of the mobile device 120 having installed thereon the client-side cash validation application 124. The user 122 may update the status of the banknotes having the unique identifiers 112*a* and 112*b* from captured to released at 412.

At 414, the banknotes having the unique identifiers 112*a* and 112*b* may be presented or tendered for payment at the merchant POS terminal 116*a*. The merchant may check the captured or released status of the banknotes by electronically capturing their unique identifiers 112*a* and 112*b* and transmitting the unique identifiers 112*a* and 112*b* to the cash validation server 102 for verification against the statuses stored in the database 104 connected to the cash validation server 102 at 416.

In this embodiment, the banknotes having the unique identifiers 112*a* and 112*b* were released by the user 122 at 412 and the cash validation server 102 accordingly transmits an accept banknote message to the merchant POS terminal 116*a* at 418. If the banknote having the unique identifier 112*c* had been presented for payment, the cash validation server 102 would have transmitted a decline banknote message to the merchant POS terminal 116*a*.

Advantageously, a method and system of validating cash transactions as hereinbefore described may remove the anticipated reward of the theft of banknotes by foiling the theft and increasing the risk of being caught.

The invention claimed is:

1. A method of validating a cash transaction at a cash validation server of a cash transaction validation system, comprising:
   capturing a unique identifier of a banknote of a user;
   storing the unique identifier of banknote against a user identity of the user in a database connected to the cash validation server;
   checking the unique identifier of the banknote against the user identity stored in the database when the banknote is received as tender for payment at a receiving Cash Processing Terminal (CPT);
   requesting an authorization from the user to release the banknote for payment;
   transmitting an accept banknote message to the receiving CPT when a successful authorization is received and transmitting a decline banknote message to the receiving CPT when a failed authorization is received.

2. The method of claim 1, wherein checking the unique identifier of the banknote against the user identity stored in the database comprises electronically receiving the unique identifier at a client-side cash validation application installed on the receiving CPT and transmitting the unique identifier to a server-side cash validation application installed on the cash validation server.

3. The method of claim 1, wherein the receiving CPT comprises a merchant Point of Sale (POS) terminal.

4. The method of claim 1, wherein requesting an authorization from the user comprises receiving the authorization from a front-end user terminal, the front-end user terminal is a mobile device or a desktop computer, a user authentication application is installed on the front-end user terminal, the user authentication application is a mobile device application when the front-end user terminal is the mobile device, the user authentication application is a desktop computer application when the front-end user terminal is the desktop computer and the user authentication application is in data communication with the merchant POS terminal or the server-side cash validation application installed on the cash validation server.

5. The method of claim 1, wherein capturing a unique identifier of a banknote comprises capturing the unique identifier at a dispensing CPT.

6. The method of claim 1, wherein the client-side cash validation application is integrated with the merchant POS terminal.

7. The method of claim 1, wherein the unique identifier of the banknote comprises a banknote serial number.

8. The method of claim 1, wherein capturing a unique identifier of a banknote comprises presenting the user with an option to capture the banknote at the dispensing CPT when the banknote is withdrawn.

9. The method of claim 1, which comprising flagging the unique identifier of the banknote with a captured status or a released status.

10. The method of claim 1, wherein requesting an authorization from the user comprises authenticating the user at the merchant POS terminal using a Personal Identification Number (PIN) or two-factor authentication.

11. The method of claim 1, wherein the dispensing CPT is part of a local dispensing CPT network of a bank, the merchant POS terminal is part of a local merchant POS network and the cash validation server is located remote from the local dispensing CPT network and the local merchant POS network.

12. The method of claim 1, wherein the dispensing CPT comprises an Automatic Teller Machine (ATM) and the captured status or the released status of the banknote is updated at the server-side cash validation application.

13. The method of claim 1, comprising tracking the banknote using the unique identifier.

14. The method of claim 13, wherein tracking the banknote comprises analyzing a lifecycle of the banknote and providing supply and location information about the banknote.

15. The method of claim 1, comprising displaying a notification of the user identity and the captured status or the released status of the banknote at the merchant POS terminal when the authorization is received from the user.

16. A system of validating a cash transaction, comprising:
a cash validation server connected to a database, wherein a server-side cash validation application is installed on the cash validation server and
a receiving Cash Processing Terminal (CPT), wherein a client-side cash validation application is installed on the receiving CPT and
wherein the system of validating the cash transaction is to:
capture a unique identifier of a banknote of a user;
store the unique identifier of the banknote against a user identity of the user in the database;
check the unique identifier of the banknote against the user identity stored in the database when the banknote is received as tender for payment at the receiving CPT;
request an authorization from the user to release the banknote for payment;
transmit an accept banknote message to the receiving CPT when a successful authorization is received and
transmit a decline banknote message to the receiving CPT when a failed authorization is received.

17. The system of claim 16, wherein the receiving CPT is to receive the unique identifier of the banknote at the client-side cash validation application and transmit the unique identifier to the server-side cash validation application on the cash validation server to check the unique identifier against the user identity stored in the database.

18. The system of claim 16, wherein the receiving CPT comprises a merchant Point of Sale (POS) terminal.

19. The system of claim 16, comprising a dispensing CPT and a front-end user terminal, wherein the front-end user terminal is a mobile device or a desktop computer, a user authentication application is installed on the front-end user terminal, the user authentication application is a mobile device application when the front-end user terminal is the mobile device, the user authentication application is a desktop computer application when the front-end user terminal is the desktop computer and the user authentication application is in data communication with the server-side cash validation application and the merchant POS terminal.

20. The system of claim 19, wherein the dispensing CPT is part of a local dispensing CPT network, the merchant POS terminal is part of a local merchant POS network, the cash validation server is located remote from the local dispensing CPT network and the local merchant POS network and the dispensing CPT comprises an Automatic Teller Machine (ATM).

* * * * *